G. WATT.

Plow.

No. 790. Reissued Aug. 2, 1859.

N. PETERS, Photo-Lithographer, Washington, D. C.

UNITED STATES PATENT OFFICE.

GEORGE WATT, OF RICHMOND, VIRGINIA.

IMPROVEMENT IN PLOWS.

Specification forming part of Letters Patent No. 19,321, dated February 9, 1858; Reissue No. 790, dated August 2, 1859.

*To all whom it may concern:*

Be it known that I, GEORGE WATT, of Richmond, in the county of Henrico and State of Virginia, have invented a new and useful Improvement in Plows; and I do hereby declare that the following is a full, clear, and exact description of the construction and operation of the same, reference being had to the annexed drawings, forming part of this specification, in which—

Figure 1:
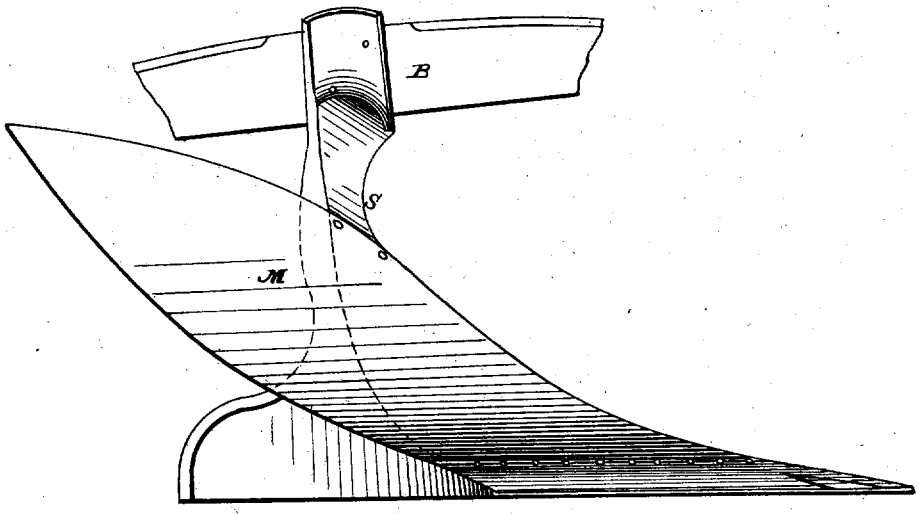
Figure 3:
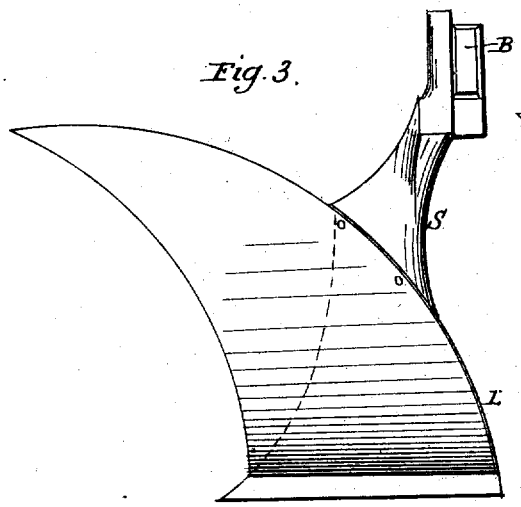
Figure 2:
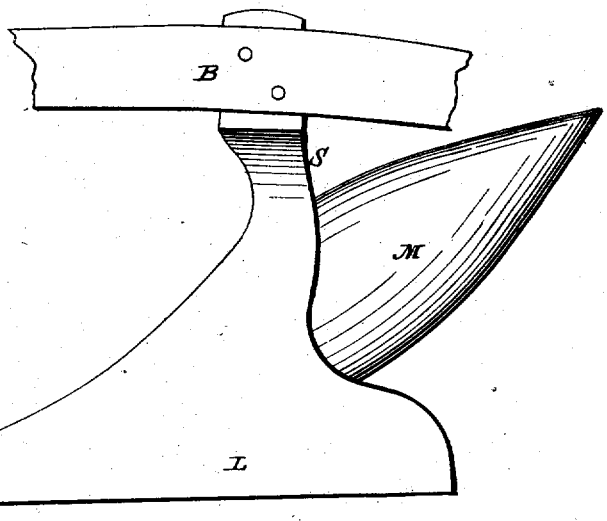

Figure 1 is a mold-board elevation of plow. Fig. 2 is a landside elevation. Fig. 3 is a front view, showing the curve of landside.

Similar characters of reference denote the same part.

The nature of my invention consists in constructing both mold-board and landside of cylindrical surfaces of equal diameters, the turn of the mold-board commencing from the extreme point and the cutting-edge being determined by the intersection of the said cylindrical surfaces, the mold-board having its concavity outward and the landside the reverse, said construction being combined with a curved standard running landward from the top of the mold-board to bring the beam attachment nearly over the base of the landside, so that the point of the beam may be over the line of draft and the standard offer the least possible obstruction to the passage of rubbish, as hereinafter to be described.

In the drawings, M is the mold-board; L, the landside; S, the standard, and B the beam. The mold-board turns outward in a regular cylindrical surface from its intersection with the share, the elements of the cylinder being respectively parallel to this line of intersection.

The landside L is a regular cylindrical surface of the same diameter as the cylinder of which the mold-board forms a portion, the front or cutting edge of the plow being formed by the intersection of their two surfaces.

The standard S curves landward from the upper extremity of the cylindrical landside to a point nearly over the base of the landside, where it terminates with a plain face for the attachment of the beam B, this surface of attachment being such as to bring the point of the beam over the line of draft, the standard being cut away and hollowed out on the mold-board side, to prevent clogging, as described in my patent of December 9, 1856, reissued November 10, 1857.

The landside L, being of cylindrical form, passes obliquely under the soil, by which the plow is rendered much more steady, as it is prevented from rising at the heel or tilting over. It also saves the point from beveling from wear. It moreover leaves an overhanging arch of soil, which is more easily turned in making the succeeding furrow.

Owing to the perfect cylindrical surfaces of mold-board and landside, and their intersection along the cutting-edge, the soil is gradually turned over from the extreme point upward, by which a considerable saving in draft is effected. The curving of the standard, as shown in the drawings, permits the rising earth to pass off without clogging under the beam.

I do not claim of itself the inclination of the landside toward the mold-board for the purpose of leaving soil overhanging the furrow, as such device, broadly considered, is not new; but What I do claim, and desire to secure by Letters Patent, is—

Constructing mold-board and landside of cylindrical surfaces of equal diameters, intersecting along the cutting-edge of the plow, in combination with the standard S, curving landward from the top of the mold-board to a position nearly over the base of the landside, as herein set forth.

In testimony whereof I have hereunto signed my name before two subscribing witnesses.

GEO. WATT.

Witnesses:

GEO. PATTEN,

JOHN S. HOLLINGSHEAD.